(12) United States Patent
Yousefzadeh et al.

(10) Patent No.: US 10,605,676 B2
(45) Date of Patent: Mar. 31, 2020

(54) HEATER-ASSISTED VOLTAGE CALIBRATION OF DIGITAL TEMPERATURE SENSORS

(71) Applicant: NXP B.V., Eindhoven (NL)

(72) Inventors: Bahman Yousefzadeh, Delft (NL); Kamran Souri, Rijswijk (NL); Kofi A. A. Makinwa, Delft (NL)

(73) Assignee: NXP B.V., Eindhoven (NL)

( * ) Notice: Subject to any disclaimer, the term of this patent is extended or adjusted under 35 U.S.C. 154(b) by 305 days.

(21) Appl. No.: 15/422,687

(22) Filed: Feb. 2, 2017

(65) Prior Publication Data
US 2018/0217009 A1    Aug. 2, 2018

(51) Int. Cl.
*G01K 15/00*    (2006.01)
*G01K 7/01*    (2006.01)

(52) U.S. Cl.
CPC .......... *G01K 15/005* (2013.01); *G01K 7/01* (2013.01)

(58) Field of Classification Search
CPC ................ G01K 15/005; G01K 7/01
USPC ................. 374/1; 702/99
See application file for complete search history.

(56) References Cited

U.S. PATENT DOCUMENTS

| | | | | |
|---|---|---|---|---|
| 5,852,360 A | * | 12/1998 | Levinson | G05F 3/245 323/316 |
| 8,665,130 B2 | * | 3/2014 | Makinwa | G01K 1/024 341/155 |
| 2010/0156519 A1 | * | 6/2010 | Cremonesi | G05F 1/46 327/539 |
| 2013/0136149 A1 | * | 5/2013 | Soenen | G01K 7/16 374/1 |

OTHER PUBLICATIONS

Pertijs et al., "Low-Cost Calibration Techniques for Smart Temperature Sensors," IEEE Sensors Journal, vol. 10, No. 6, Jun. 2010, 8 pages.
Satoh et al., "A 2.9mW, +/− 85ppm Accuracy Reference Clock Generator Based on RC Oscillator with On-chip Temperature Calibration," 2014 Symposium on VLSI Circuits Digest of Technical Papers, 2 pages.
Souri et al., "A CMOS Temperature Sensor With a Voltage-Calibrated Inaccuracy of ±15 C (3σ) From −55° C. to 125° C.," IEEE Journal of Solid-State Circuits, vol. 48, No. 1, Jan. 2013, 10 pages.
Yousefzadeh et al., "A BJT-based Temperature-to-Digital Converter with ±60mK (3σ) Inaccuracy from −70° C. to 125° C. in 160nm CMOS," 2016 Symposium on VLSI Circuits Digest of Technical Papers, 2 pages.

(Continued)

*Primary Examiner* — Natalie Huls
*Assistant Examiner* — Janice M Soto

(57) ABSTRACT

A method includes: calculating a first calibration temperature based on a first ratio of a known external voltage to a delta voltage that is a difference between first and second base-emitter voltages of first and second sensing transistors, calculating a first sensed temperature based on a second ratio of the first base-emitter voltage to the delta voltage, adjusting one or more temperature fitting parameters based on a comparison of the first sensed temperature with the first calibration temperature; activating the on-chip heater; calculating a second calibration temperature based, at least in part, on a third ratio of the known external voltage to the delta voltage, calculating a second sensed temperature based on a fourth ratio of the first base-emitter voltage to the delta voltage, adjusting at least one of the one or more temperature fitting parameters based on a comparison of the second sensed temperature with the second calibration temperature.

10 Claims, 9 Drawing Sheets

(56) References Cited

OTHER PUBLICATIONS

Abesingha et al., "Voltage shift in plastic-packaged bandgap references," IEEE Transactions on Circuits and Systems—II: Analog and Digital Signal Processing, vol. 49, No. 10, Oct. 2002, 5 pages.
NXP, "LM75A Digital temperature sensor and thermal watchdog; Product data sheet", Rev. 04, Jul. 10, 2007, 24 pages.
Souri et al., "A CMOS temperature sensor with an energy-efficient zoom ADC and an Inaccuracy of ±0.25° C (3s) from -40° C to 125° C," 2011 IEEE International Solid-State Circuits Conference, Feb. 7-11, 2010, 3 pages.
Souri et al., "A 0.12 mm2 7.4 uW Micropower Temperature Sensor With an Inaccuracy of ±0.2° C (3o) From -30° C to 125° C," IEEE Journal of Solid-State Circuits, vol. 46, No. 7, Jul. 2011, 8 pages.
Pertijs et al., "A CMOS Smart Temperature Sensor with a 3o Inaccuracy of ±0.1° C from -55° C to 125° C," IEEE Journal of Solid-State Circuits, vol. 40, No, 12, Dec. 2005, 11 pages.
Van Vroonhoven, "A thermal-diffusivity-based temperature sensor with an untrimmed inaccuracy of ±0.2° C (3s) from -55° C to 125° C," 2010 IEEE International Solid-State Circuits Conference, Feb. 7-11, 2010.
Sebastiano et al., "A 1.2V 10μW NPN-Based Temperature Sensor in 65nm CMOS with an inaccuracy of ±0.2° C (3s) from -70° C to 125° C," 2010 IEEE International Solid-State Circuits Conference, Feb. 9, 2010, 3 pages.

\* cited by examiner

HEATER-ASSISTED VOLTAGE CALIBRATION OF DIGITAL TEMPERATURE SENSORS

BACKGROUND

Field

This disclosure relates generally to digital temperature sensors, and more specifically, to heater-assisted calibration of digital temperature sensors.

Related Art

Modern temperature sensors often include an analog temperature sensor that produces temperature dependent voltages, and an analog-to-digital converter (ADC) that converts a ratio of the voltages to a digital output. During the integrated circuit (IC) fabrication process of a temperature sensor, process inconsistencies may occur that cause variability in the device parameters of the sensor, referred to as process spread, or plastic packaging may increase mechanical stress on the sensor's die and also cause variability, referred to as packaging shift. Such variability affects the initial inaccuracy of an un-calibrated temperature sensor, which may be as great as ±2.0° C. at room temperature, despite the variability remaining within manufacturing tolerances.

A conventional approach to reduce this inaccuracy includes reducing manufacturing tolerances to achieve less device variability, but such an approach is expensive and unsuited for mass-produced sensors using a low-cost IC fabrication process. Another conventional approach includes using thermal calibration to trim the analog temperature sensor, which usually requires comparing a reading of the sensor with a reading of a reference thermometer of known accuracy at the same temperature as the sensor, and then adjusting a trim value. This approach usually requires bringing the sensor (or a batch of sensors) and the thermometer into good thermal contact using a thermally-conducting medium, such as a liquid bath, or a metal block, where a thermal equilibrium will then be obtained after a minutes-long wait time. For example, achieving a stable temperature may require the sensors to be in an oven for minutes at a time, increasing calibration costs in both time and money. Performing additional trimming operations at different temperatures requires an even longer wait time and additional infrastructure, which further complicates the trimming operations.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

The present disclosure provides a method for calibrating a digital temperature sensor well within ±1 degree Celsius accuracy, which is achieved in seconds (rather than minutes) and does not require expensive thermal equipment like an oven. The calibration process includes performing voltage calibration at two different temperatures (such as room temperature and at an elevated temperature). Rather than using an oven, the digital temperature sensor includes an on-chip heater that achieves the elevated temperature within seconds, which significantly reduces the time required to perform calibration. One or more fitting parameters are then adjusted in the digital domain based on the voltage calibrations. Temperature interpolation may also be used to further improve the accuracy of the calibration, as well as shorten the calibration time, at the elevated temperature. Such a heater-assisted voltage calibration process achieves results that are comparable with conventional thermal calibration, without requiring expensive thermal equipment like a temperature-stabilized oven, or a minutes-long wait time for thermal equilibrium. For at least these reasons, the present heater-assisted voltage calibration process is well suited to volume production, especially for low-cost plastic packaged temperature sensors.

Example Embodiments

Figure 1:
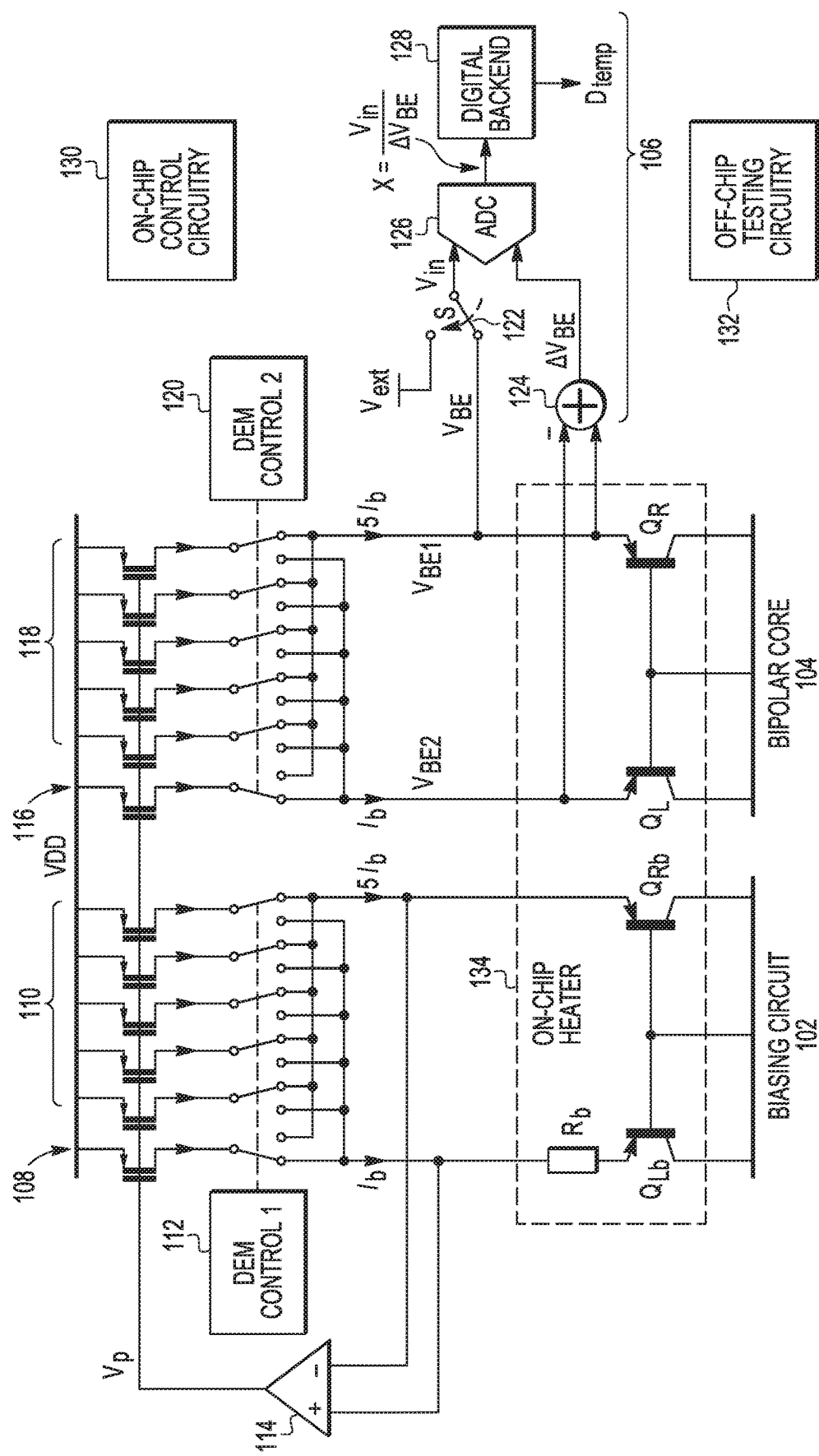
FIG. 1 and FIG. 2 illustrates schematic diagrams depicting components of example digital temperature sensor devices in which the present disclosure is implemented, according to some embodiments.
Figure 5:
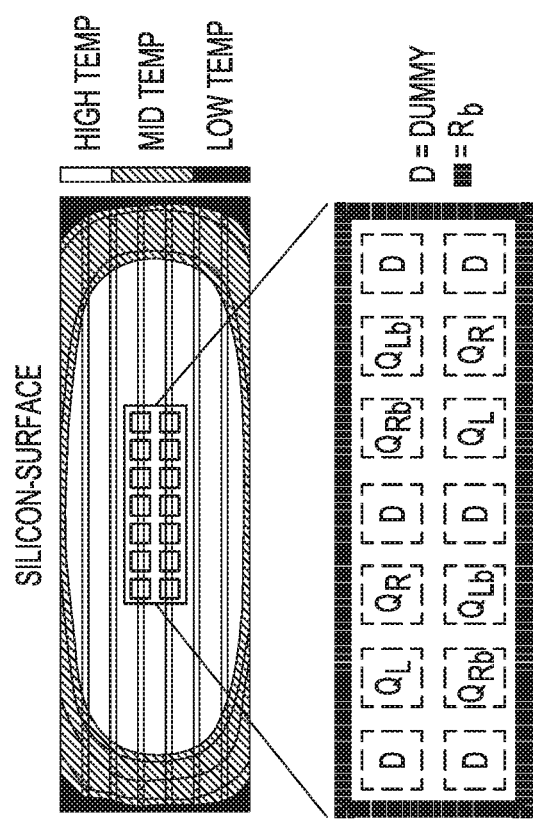

FIG. 1 illustrates a schematic diagram of a digital temperature sensor device according to one embodiment of the present disclosure, which includes a biasing circuit 102, a bipolar core 104, and voltage-to-temperature conversion circuitry 106 that includes an analog-to-digital converter (ADC) 126 and digital backend circuitry 128. The biasing circuit 102 includes a pair of biasing transistors QLb and QRb, and the bipolar core 104 includes a pair of sensing transistors QL and QR. The transistors QLb, QRb, QL, and QR are implemented using bipolar junction transistors (also referred to as BJTs or bipolar transistors), where the four transistors are substantially identical. In the embodiments discussed herein, the transistors QLb, QRb, QL, and QR are implemented using four PNP type substrate transistors, although NPN type substrate transistors may be used in other embodiments. As will be apparent to one skilled in the art, the term "substrate transistor" as used herein is a transistor in which the collector current flows into the substrate, rather than into a discrete collector terminal. Additionally, to mitigate BJT mismatch, the transistors QLb, QRb, QL, and QR are placed in an interdigitated layout, which is shown in FIG. 5.

In the biasing circuit 102, biasing transistors QLb and QRb each have a grounded collector and a grounded base. In the embodiment shown in FIG. 1, the base of QLb and the base of QRb are coupled to a common base connection, which is coupled to ground. The emitter of QLb is coupled to a biasing resistive element having a resistance Rb, which in turn is coupled to a supply voltage (VDD) via a first current source 108. The emitter of QRb is also coupled to the supply voltage (VDD) via a second current source 110. The first and second current sources 108 and 110 are configured to respectively provide a first and second current according to a current ratio of 1:p, where p is an integer greater than one. In other words, the current provided by the second current source 110 is p times greater than the current provided by the first current source 108. In the embodiment shown, a current ratio using p=5 is implemented, although other values of p may be used in other embodiments.

The first and second current sources 108 and 110 are each implemented using one or more metal-oxide-semiconductor field-effect transistors (MOSFETs), which are substantially identical. In the embodiment shown in FIG. 1, the first and second current sources 108 and 110 are implemented using a total of p+1 MOSFETs, where the first current source 108 is implemented using one MOSFET, and the second current source 110 is implemented using p=5 MOSFETs, although other numbers of MOSFETs may be used to implement the current sources according to the current ratio in other embodiments (e.g., 2 MOSFETs for the first current source and 10 MOSFETs for the second current source for the same current ratio using p=5).

In order to mitigate circuit mismatch error in the current sources, a dynamic element matching (DEM) scheme is used. Each MOSFET has a gate tied to a common gate connection, a source coupled to VDD, and a drain coupled to a respective switch, where DEM control 1 circuitry 112 is configured to control each switch to connect the drain of a respective MOSFET to the emitter of either QLb (via resistive element Rb) or QRb. In the embodiment shown, any one (or more) of the MOSFETs used to implement the first current source 108 may be switched to the emitter of QLb (via resistive element Rb), and the remaining p MOSFETs that implement the second current source 110 are switched to the emitter of QRb. While each MOSFET may be associated with an error or deviation that may cause the respective current source to deviate from the ideal current ratio value p, DEM techniques are used to average out these errors to achieve (on average) an accurate 1:p current ratio. In other embodiments (not shown), DEM techniques may also be used to minimize any errors associated with mismatch of QLb and QRb.

The emitters of QLb and QRb are linked by an operational amplifier 114, which forces the voltages on the drains of the MOSFETs of current sources 108 and 110 to be the same, which in turn forces the voltage across the resistive element Rb to be a function of the difference in the base-emitter voltages of QLb and QRb. The base-emitter voltage (VBE) of a bipolar transistor is expressed as:

$$VBE = \eta \cdot (kT/q) \cdot \ln(IC/IS) \qquad \text{Eq. 1,}$$

where $\eta$ is a process dependent non-ideality factor (q being approximately 1), k is the Boltzmann constant, q is the electron charge, T is the sensor's absolute temperature (in Kelvin), IC is the collector current, and/S is the transistor's saturation current. The base-emitter voltage VBE is complementary to absolute temperature (CTAT).

In contrast to VBE, the voltage difference $\Delta$VBE (or delta VBE) between base-emitter voltages (VBE1 and VBE2) of a pair of (identical) bipolar transistors is proportional to absolute temperature (PTAT), which is expressed as:

$$\Delta VBE = VBE2 - VBE1 = \eta \cdot (kT/q) \cdot \ln(p) \qquad \text{Eq. 2,}$$

where p is the current ratio at which the bipolar transistors are biased. A well-defined bias current Ib is established through the resistive element Rb of biasing circuit 102, expressed as:

$$Ib = \Delta VBE/Rb \qquad \text{Eq. 3,}$$

where the voltage across the resistive element Rb is proportional to absolute temperature (PTAT). The operational amplifier 114 outputs a voltage (labeled as Vp) based on the $\Delta$VBE of Rb and MOSFETs. As shown in FIG. 1, the output voltage Vp is provided to the tied gates of the p+1 MOSFETs of current sources 108 and 110. Since the MOSFETs of current sources 108 and 110 implement a current ratio p=5, their drain currents provide bias currents of Ib and 5·Ib to the emitters of QLb and QRb, respectively.

The currents provided by current sources 108 and 110 in biasing circuit 102 are respectively mirrored by third and fourth current sources 116 and 118 in bipolar core 104, which implement the same current ratio p in order to provide bias currents of Ib and 5·Ib to the respective emitters of transistors QL and QR of the bipolar core 104. In the embodiment shown, current sources 116 and 118 are also implemented using a total of p+1 MOSFETs in a same manner as the current sources 108 and 110, although a different number may be used to achieve the current ratio p in other embodiments. A DEM scheme is also used for current sources 116 and 118, where each MOSFET has a gate tied to a common gate connection, a source coupled to VDD, and a drain coupled to a respective switch, where DEM control 2 circuitry 120 is configured to control each switch to connect the drain of a respective MOSFET to the emitter of either QL or QR. In the embodiment shown, any one (or more) of the MOSFETs used to implement current source 116 may be switched to the emitter of QL, and the remaining p MOSFETs that implement current source 118 are switched to the emitter of QR. The operational amplifier 114 output Vp is also coupled to the tied gates of the p+1 MOSFETs of current sources 116 and 118. It is again noted that the current sources may be implemented with more than p+1 MOSFETs, where multiple MOSFETs may be used to implement the current sources while maintaining the p current ratio (e.g., m(p+1) MOSFETs may be used (e.g., in a cascaded fashion), where m is an integer greater than one, where the first current source is implemented using m MOSFETs, and the second current source is implemented using m·p MOSFETs).

The voltage-to-temperature conversion circuitry 106 also includes an adder 124, which has first and second inputs respectively coupled to the emitters of QL and QR. Adder 124 is configured to output the difference between the respective base-emitter voltages VBE1 and VBE2, also referred to as $\Delta$VBE, which is provided as an input to ADC 126. The voltage-to-temperature conversion circuitry 106 also includes switch 122, which has a first input node coupled to the emitter of QR (labeled VBE1) and a second input node coupled to a known external voltage (labeled as Vext). Switch 122 is configured to select either VBE1 or Vext, which is provided as another input to ADC 126. Switch 122 may be implemented as a transistor, a multiplexer, or other suitable switching means. An on-chip heater 134 is also included in the temperature sensor device of FIG. 1, which is located in close proximity to the transistors QLb, QRb, QL, and QR, and the resistive element Rb. The operation of switch 122 and on-chip heater 134 are further discussed below. An output of ADC 126 is provided to digital backend circuitry 128, which is configured to process the digital output into a temperature Dtemp, as also further discussed below.

In the bipolar core 104, sensing transistors QL and QR are biased at the same current ratio 1:p implemented in the biasing circuit 102. As noted above, the base-emitter voltages of QL (illustrated as VBE2) and QR (illustrated as VBE1) are CTAT, expressed as Equation 1, while $\Delta$VBE of QL and QR is PTAT, expressed as Equation 2.

Conventionally, VBE1 (CTAT) and $\Delta$VBE (PTAT) are linearly combined to generate a bandgap reference voltage (VREF), expressed as:

$$VREF = VBE1 + \alpha \cdot \Delta VBE \quad \text{Eq. 4,}$$

where $\alpha$ is a gain factor. The ADC would then convert or digitize a ratio between $\alpha \cdot \Delta VBE$ and VREF, which can be expressed as:

$$\mu = (\alpha \cdot \Delta VBE)/VREF = (\alpha \cdot \Delta VBE)/(VBE1 + \alpha \cdot \Delta VBE) \quad \text{Eq. 5,}$$

where PTAT function $\mu$ is a linear function of temperature.

A key observation is that VBE and $\Delta$VBE contain all the necessary information for determining a temperature, where a ratio X of VBE1 to $\Delta$VBE can simply be used as a measure of temperature, which avoids including additional circuitry for generating the reference voltage VREF. Since $\Delta$VBE is less dependent on processing parameters, $\Delta$VBE is intrinsically accurate, provided that mismatch errors in the transistors and in the 1:p current ratio are eliminated, such as by using one or more of DEM for the current sources ratio 1:p and transistors QR and QL.

ADC 126 then converts or digitizes the ratio X between VBE1 and $\Delta$VBE (PTAT), which is shown as:

$$X = Vin/\Delta VBE \quad \text{Eq. 6,}$$

where VBE1 is selected as Vin during normal operation of the temperature sensor device, and the ratio X is a monotonic, but non-linear function of temperature, generally ranging between 6 and 28 from −55° C. to 125° C. It is noted that p=5 leads to a sensitivity of about 140 µV/C°. The PTAT function $\mu$ can be expressed in terms of X as follows:

$$\mu = (\alpha \cdot \Delta VBE)/(VBE + \alpha \cdot \Delta VBE) = \alpha/(\alpha + X) \quad \text{Eq. 7,}$$

where $\alpha$ acts as a mapping coefficient or parameter between the non-linear ratio X and PTAT function $\mu$. This calculation is implemented in the digital backend 128. Since $\alpha$ is a constant in the digital domain, it is immune to process spread.

The PTAT function $\mu$ can then be linearly scaled to obtain a digital output Dtemp in degrees Celsius:

$$Dtemp = A \cdot \mu - B \quad \text{Eq. 8,}$$

where A and B are constant coefficients. A is also referred to herein as a gain parameter and B is also referred to herein as an offset parameter. The gain parameter A, the offset parameter B, and the mapping parameter a are also referred to as temperature fitting parameters, which and can be adjusted to calibrate the temperature sensor device. The temperature fitting parameters are programmable in the digital backend 128, which is simpler to realize than alternative analog techniques, such as trimming the bias current applied to QL and QR. Default values of the fitting parameters are preprogrammed into the digital backend 128 and used to calculate temperatures, where example approximate values of A may be around 600, values of B may be around 273, and values of a may be around 16.

The present disclosure provides for a temperature sensor calibration process that implements voltage calibration based on electrical measurements of VBE1 and $\Delta$VBE (as opposed to a thermal calibration comparing temperature readouts of the sensor and a thermometer with known accuracy) at two temperature points, which is also referred to herein as a two temperature point voltage calibration process or a heater-assisted voltage calibration process. In some embodiments, a first voltage calibration is performed at one temperature point (such as at room temperature or 25° C.) and a second voltage calibration is performed at an elevated temperature point (e.g., 80° C.). Only the temperature-sensitive elements of the temperature sensor are heated, which is achieved by only a single heating element. In some embodiments, only one voltage calibration needs to be performed (e.g., performing the second voltage calibration at the elevated temperature point), although it is preferable in other embodiments to complete voltage calibration at both temperature points to minimize the effects of process spread and packaging shift, which achieves calibration results comparable to the more expensive thermal calibration results.

Figure 14:
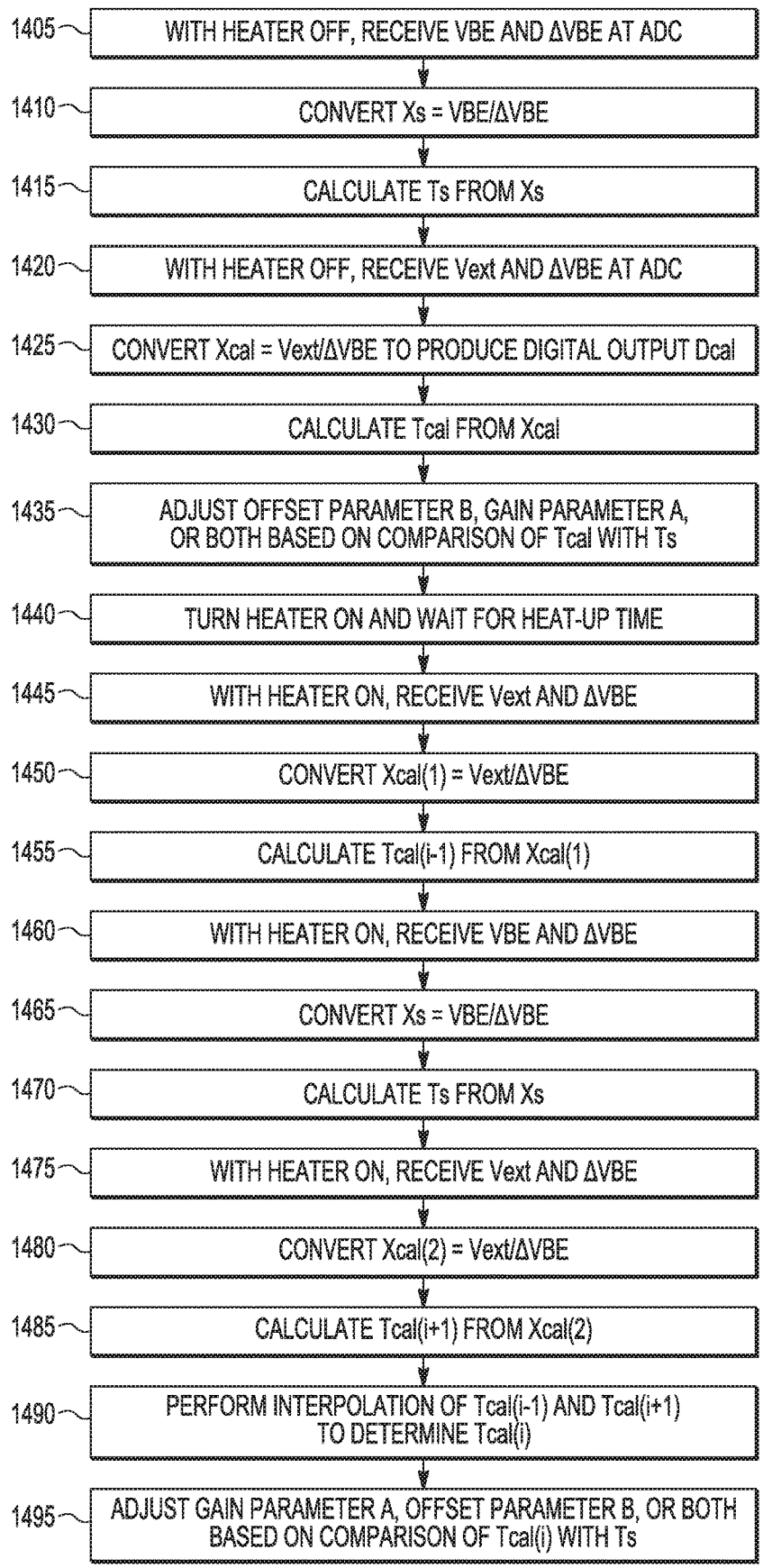
FIG. 14 illustrates a flowchart depicting an example calibration process in which the present disclosure can be implemented, according to some embodiments.

A flowchart of the two temperature point voltage calibration process is illustrated in FIG. 14. The calibration process may be implemented at least in part by the on-chip control circuitry 130 or by the off-chip testing circuitry 132. In some embodiments, it is preferred that the off-chip testing circuitry 132 implement the two point voltage calibration, since such calibration need only be performed once (i.e., after packaging in order to compensate for any packaging shift) and is not needed during normal operation of the temperature sensor device. In some embodiments, it is preferred that the on-chip control circuitry 130 control at least the switch 122 and the activation of the on-chip heater for the two point voltage calibration (i.e., in order to compensate for the effect of mounting the sensor, environmental stress, or aging effects). It is also noted that a first voltage calibration is implemented by operations 1405 through 1435 and a second voltage calibration is implemented by operations 1440 through 1495. While it is preferred that the second voltage calibration at the elevated temperature occurs after the first voltage calibration at room temperature, the second voltage calibration may be performed before the first voltage calibration in other embodiments. In such embodiments, an additional settle time between the second and first voltage calibrations may be required in order for the chip substrate temperature to return to room temperature. However, using the interpolation technique described herein offers a solution for all cases where the temperature is not completely settled.

The process illustrated in FIG. 14 begins performing a first voltage calibration at room temperature at operation 1405, where the base-emitter voltage VBE1 of transistor QR is selected by switch 122. The voltages VBE1 and $\Delta$VBE (which is the difference between base-emitter voltages of transistors QR and QL) are received at ADC 126 while the on-chip heater 134 remains off. The process then continues to operation 1410, where ADC 126 converts or digitizes ratio Xs=VBE1/$\Delta$VBE, which is provided to digital backend 128. The process then continues to operation 1415, where the digital backend 128 calculates an uncalibrated temperature of the chip substrate in which the transistors QLb, QRb, QL, and QR are located, also referred to as Ts. It is noted that since the digital conversion performed by ADC 126 is on the order of 20 ms, the chip substrate temperature is assumed to be constant during the digital conversion, allowing ADC 126 to output an accurate digital representation of the chip substrate temperature at that time. The digital backend calculates Ts from Xs using default values of the fitting parameters. Temperature Ts is provided to either on-chip control circuitry 130 or to off-chip testing circuitry 132, depending on which circuitry is configured to implement the calibration process.

The process continues to operation 1420, where the known external voltage Vext is selected by switch 122, where the voltage level of Vext is comparable to the voltage level of VBE1 in some embodiments (e.g., 0.65V). The voltages Vext and $\Delta$VBE are received at ADC 126 while the on-chip heater remains off. The process continues to operation 1425, where ADC 126 converts ratio Xcal=Vext/$\Delta$VBE, which is provided to digital backend 128. The process continues to operation 1430, where digital backend 128 calculates a calibration temperature Tcal from Xcal using default values of the fitting parameters, given that Vext is a known value and $\Delta$VBE is a predictable voltage with respect to temperature (and is less variant to process and packaging effects). Temperature Tcal is provided to the implementing circuitry (which is either on-chip control circuitry 130 or off-chip testing circuitry 132, as noted above). While the present embodiment shows that Tcal is calculated (by operations 1420 through 1430) after Ts is calculated (by operations 1405 through 1415), it is noted that Tcal may be calculated before Ts in other embodiments.

The process continues to operation 1435, where the implementing circuitry compares temperatures Tcal and Ts and adjusts one or more of the fitting parameters by increasing or decreasing the value of the fitting parameters to reduce the error between Tcal and Ts. In one embodiment, the implementing circuitry adjusts one or more of gain parameter A, offset parameter B, mapping parameter a, or all parameters, based on the comparison of Tcal and Ts. In some embodiments, the implementing circuitry immediately programs the adjusted values of the fitting parameters into the digital backend 128, while in other embodiments, the implementing circuitry may wait to program the adjusted values into the digital backend 128 until the completion of the second voltage calibration.

The process then continues to operation 1440, where the implementing circuitry turns on the on-chip heater 134 to heat the chip substrate up to an elevated temperature and waits for a heat-up time. The on-chip heater 134 is capable of heating the chip substrate from room temperature up to approximately 85° C. in 0.5 seconds.

In some embodiments, the second voltage calibration occurs after this heat-up time to allow the chip substrate temperature to stabilize at the elevated temperature. In such embodiments, a chip substrate temperature Ts is obtained based on VBE1 and a calibration temperature Tcal is obtained based on Vext at the elevated temperature (as similarly obtained in the first voltage calibration in operations 1405 through 1435, while the on-chip heater remains on). The implementing circuitry adjusts one or more of the fitting parameters, based on the comparison of Tcal and Ts. The implementing circuitry is not required to wait long for the chip substrate to heat up to approximately 85° C. However, the chip substrate temperature will likely continue to increase between the times at which Ts and Tcal are obtained, where the resulting calibration may not provide the desired temperature accuracy.

In the embodiments discussed herein, an interpolation method is implemented to rapidly estimate the elevated temperature in order to improve accuracy of the calibration while achieving the much shorter heat-up time (e.g., 0.5 seconds), rather than wait for the elevated temperature to completely settle (e.g., greater than 2 seconds). The interpolation method also minimizes any error that may occur when comparing temperatures from different points in time as the chip substrate temperature continues to change (e.g., as it heats up or cools down over time).

Returning to FIG. 14, the second voltage calibration of the calibration process begins at operation 1445, where Vext is selected by switch 122 and the voltages Vext and $\Delta$VBE are received at ADC 126. The process continues to operation 1450, where ADC 126 converts ratio Xcal(1)=Vext/$\Delta$VBE. The process continues to operation 1455, where the digital backend 128 calculates a first intermediate calibration temperature Tcal(i−1) from Xcal(1), which corresponds to a first point in time. The temperature Tcal(i−1) is provided to the implementing circuitry.

The process then continues to operation 1460, where VBE1 is selected by switch 122 and the voltages VBE1 and $\Delta$VBE are received at ADC 126. The process continues to operation 1465, where ADC 126 converts ratio Xs=VBE1/$\Delta$VBE. The process continues to operation 1470, where the digital backend 128 calculates a chip substrate temperature Ts from Xs, which corresponds to a (later) second point in time. The temperature Ts is provided to the implementing circuitry.

The process then continues to operation 1475, where Vext is selected by switch 122 and the voltages Vext and $\Delta$VBE are received at ADC 126. The process continues to operation 1480, where ADC 126 converts ratio Xcal(2)=Vext/$\Delta$VBE. The process continues to operation 1485, where the digital backend 128 calculates a second intermediate calibration temperature Tcal(i+1) from Xcal(2), which corresponds to a (still later) third point in time. The temperature Tcal(i+1) is provided to the implementing circuitry.

Since the ADC 126 completes each conversion in some uniform amount of time and these three temperatures are obtained in a back-to-back manner (or in an immediately sequential manner), the amount of time elapsed between obtaining temperatures Tcal(i−1) and Ts is equal to the amount of time elapsed between obtaining temperatures Ts and Tcal(i+1). The intermediate temperatures Tcal(i−1) and Tcal(i+1) are interpolated in operation 1490 to determine a final calibration temperature Tcal(i) that corresponds to the second point in time at which temperature Ts was obtained. This interpolation is further discussed below in connection with FIG. 6. The implementing circuitry then compares Ts and Tcal(i), calculates the necessary adjustments to one or more of the fitting parameters to reduce the error between Ts and Tcal(i), and programs the value of the one or more adjusted fitting parameters into the digital backend 128. In one embodiment, the implementing circuitry adjusts gain parameter A, offset parameter B, or both, based on the comparison of Tcal(i) and Ts. The process then ends.

The present two temperature point voltage calibration not only greatly shortens the amount of time necessary for achieving calibration of a digital temperature sensor device, but also achieves a high degree of accuracy comparable with the more expensive thermal calibration process. For example, in embodiments where the ADC 126 (such as a zoom ADC, discussed below) achieves conversion in approximately 20 ms, the entire two temperature point voltage calibration takes about 1 second (as opposed to thermal calibration requiring a settle time on the order of minutes), and reduces inaccuracies to ±0.3° C. over the military range of −55° C. to +125° C. After calibration, the digital temperature sensor is then set for normal operation by setting switch 122 to VBE1 (and by turning on-chip heater 134 off), where the digital backend 128 continues to use the adjusted fitting parameters to output a calibrated temperature reading.

Returning to FIG. 1, an analog-to-digital converter (ADC) is required that receives inputs and performs conversion with adequate resolution (e.g., 10× higher than then calibration accuracy) and speed (e.g., much higher than the thermal transient) as the substrate temperature changes while being exposed to heat. A second order zoom-ADC might be used in some embodiments, which digitizes the ratio X in two steps, where the first step uses a relatively inaccurate but fast algorithm, such as a successive approximation algorithm, to identify an approximate value of the analog signal. A second order sigma delta modulator is used in the second step to accurately determine the digital result, which covers a smaller range of voltages around the approximate value determined in the first step. Since the bitstream output of the sigma delta modulator is typically averaged in a digital decimation filter (which is included in the digital backend 128 shown in FIG. 1), dynamic error correction techniques such as DEM and chopping (further discussed below in connection with FIG. 2) can be used to obtain high accuracy after such filtering, even with relatively low accurate components, which is suitable for low-cost temperature sensor IC fabrication.

Figure 2:
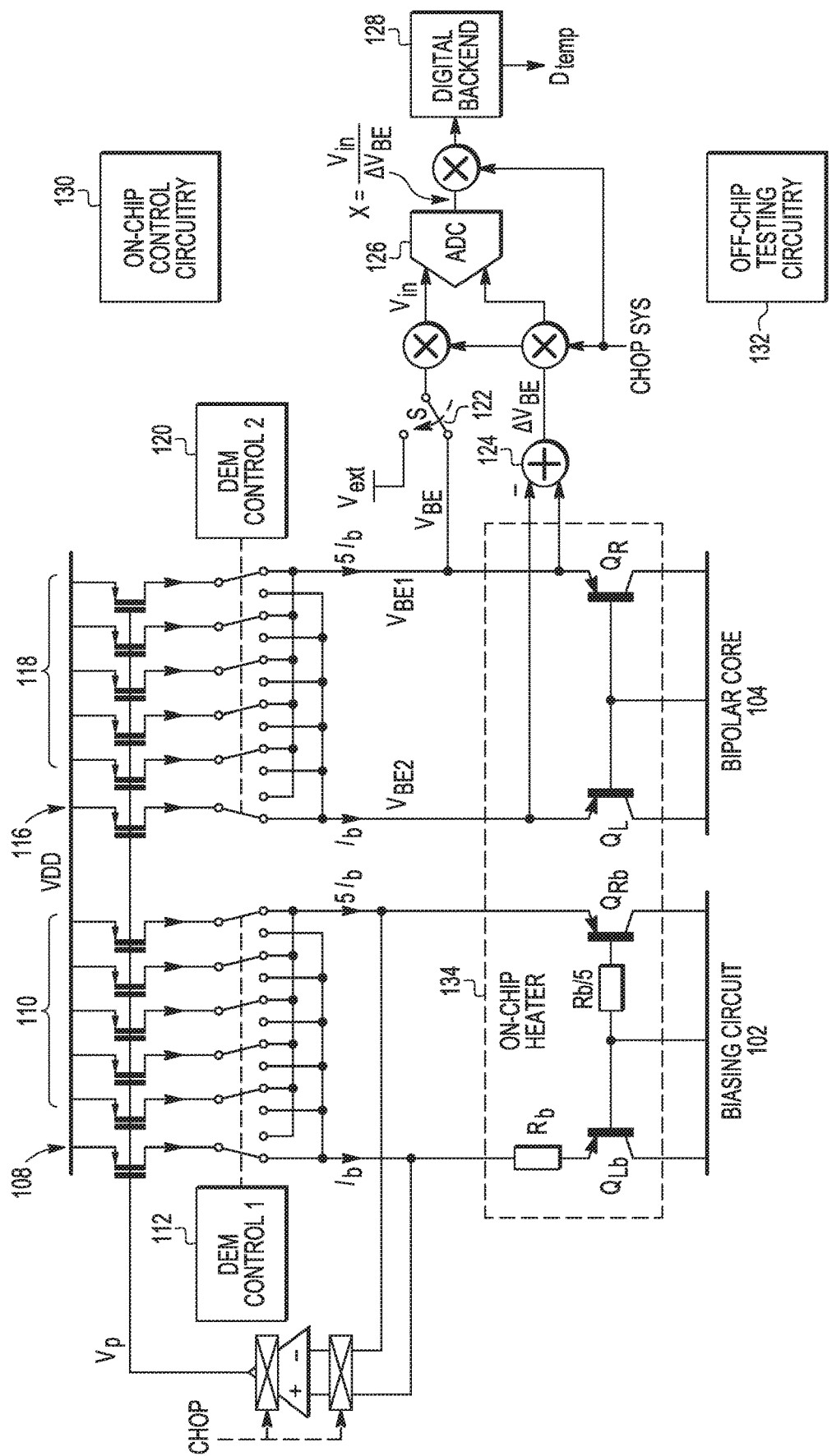

FIG. 2 illustrates a schematic diagram depicting components of another example digital temperature sensor device implementing corrections schemes known in the art. The components of FIG. 2 are analogous to those components shown in FIG. 1, with the addition of a second biasing resistor having a resistance Rb/5 coupled between the base of QRb and ground, and a system-wide chopping scheme.

The second biasing resistive element Rb/5 implements a beta (β) cancellation scheme, as known in the art. Transistor QR is matched to transistor QRb and carries the same drain current. However, the collector current of QR may not be PTAT due to its finite current gain βf, and as a result its base-emitter voltage VBE1 may be affected by process spread and temperature-dependency of βf. By including the second biasing resistive element, the bias current produced by biasing circuit 102 is a PTAT collector current (rather than an emitter current) that, when used to bias the substrate bipolar transistors of bipolar core 104 via their emitters, produces base-emitter voltages substantially independent of the forward current gain of the substrate bipolar transistor QR, which improves the robustness of the resulting VBE1 to process spread.

The chopping scheme refers to a technique for compensating any signal pathway mismatches, as known in the art. Signal pathway mismatches may be related to component tolerances, fabrication processes, trace paths, and other mismatched components that may produce voltage offsets in the signal pathways. Chopping helps to remove the offsets by alternating signal pathways to balance mismatch impact over time. Chopping signals are provided by on-chip control circuitry 130 to select alternate pathways within the temperature sensor, such as at inputs and output of operational amplifier 114 and at inputs and outputs of ADC 126.

Figure 3:
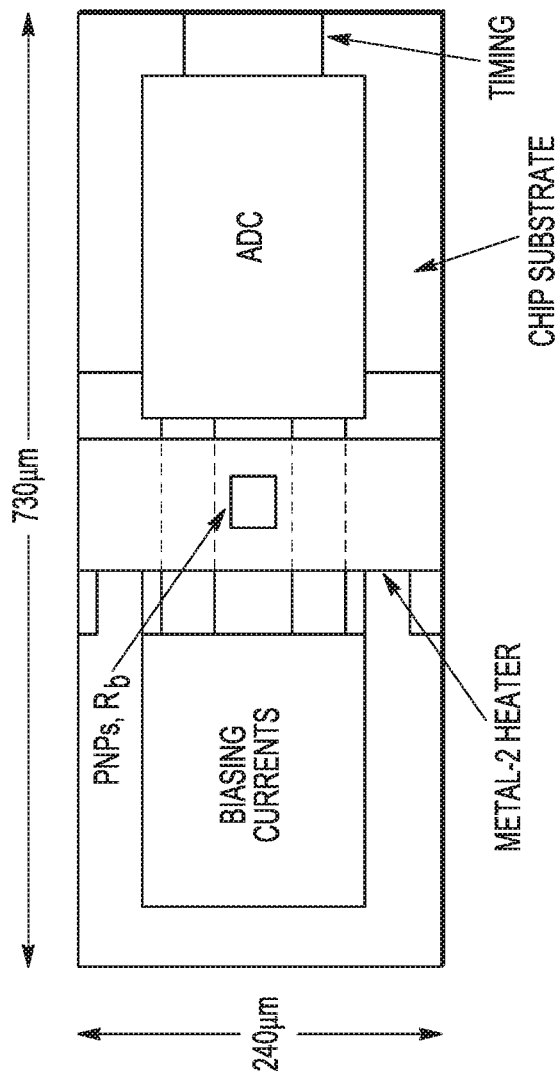
FIG. 3 illustrates a block diagram of an example digital temperature sensor device layout, according to some embodiments.

FIG. 3 illustrates a top-down view of an example digital temperature sensor device layout on a chip substrate. In the embodiment shown, the temperature sensor occupies approximately 0.17 mm$^2$ using a CMOS (complementary metal-oxide-semiconductor) fabrication process, although the temperature sensor may be differently sized in other embodiments. In one embodiment, the ADC 126 is implemented using a zoom ADC that achieves 7.5 mK resolution in a 20 ms conversion time, although different resolution and conversion times may be achieved based on the type of ADC implemented in the temperature sensor device. The biasing current sources 108, 110, 116, and 120 are shown in the large block on the left, which are coupled to provide biasing currents to PNP type transistors QLb (via resistive element Rb), QRb, QL, and QR in the small center block. ADC 126 is shown in the large block on the right, which reads VBE1 and ΔVBE from transistors QL and QR, as discussed above. The on-chip heater 134 is also shown as the large center block, which overlies transistors QLb, QRb, QL, and QR, as well as resistive element Rb, which is shown in further detail in FIGS. 4 and 5. Timing control implemented by on-chip control circuitry 130 is shown in the small block on the right, which implements (at least in part) the two temperature point voltage calibration process, as further discussed in connection with FIG. 14. In the embodiment shown, other components of the digital temperature sensor are located off-chip, such as the digital backend 128, while such components may be located on-chip in other embodiments. Additionally, some aspects of the timing control used in the calibration process may be implemented in off-chip testing circuitry 132, such as controlling on-chip heater 134, as further discussed below.

Figure 4:
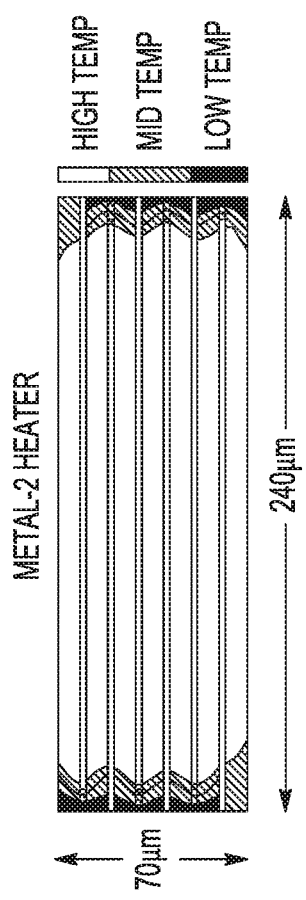
FIG. 4 and FIG. 5 illustrate block diagrams depicting metal and silicon layers of an example digital temperature sensor device, according to some embodiments.

FIG. 4 illustrates a top-down view of an example metal layer of the chip substrate shown in FIG. 3. In the embodiment shown in FIG. 4, on-chip heater 134 is implemented in a metal 2 layer in a serpentine layout that occupies approximately 0.017 mm$^2$. The on-chip heater 134 is a 17 ohm heater that is pulsed by a 0.2 A current (approximately 0.7 W) to heat the chip substrate from room temperature to approximately 85° C. in approximately 0.5 seconds. An example steady-state heating gradient generated by the on-chip heater 134 is also shown in FIG. 4, with a temperature differential of approximately 20 to 60° C. between a central area of the on-chip heater 134 and near the edges of the on-chip heater 134. In order to mitigate the effects of such a large temperature gradient on the temperature sensor device, the transistors QLb, QRb, QL, and QR and resistive element Rb are located within central area of the on-chip heater 134, as shown in the top-down view of FIG. 5 that illustrates an example silicon surface of the chip substrate. As shown in FIG. 5, transistors QLb, QRb, QL, and QR are placed in an interdigitated layout, with resistive element Rb surrounding the transistors. The on-chip heater 134 (in metal 2 layer) is centered over this layout, resulting in a gradient-insensitive layout. Only the temperature-sensitive elements of the temperature sensor are heated, which is achieved by only a single heating element.

Figure 6:
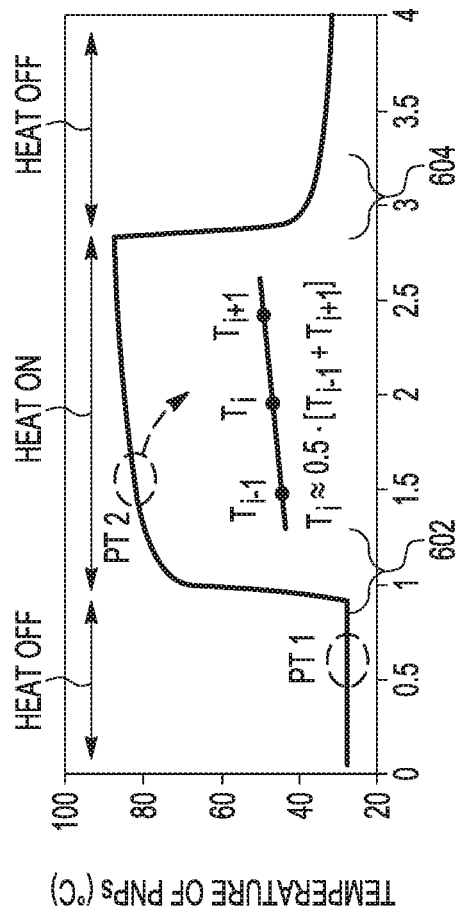
FIG. 6 illustrates a plot graph depicting an example chip substrate temperature curve, according to some embodiments.

FIG. 6 illustrates a plot graph depicting an example chip substrate temperature curve during which the two temperature point voltage calibration is performed. A first voltage calibration is performed at temperature point 1 (labeled Pt 1) while the chip substrate is at room temperature of 25° C. and the on-chip heater remains off. Since the ratios Xs and Xcal are digitized while the chip substrate remains at the same room temperature, the temperatures Ts and Tcal also correspond to the same chip substrate temperature, even though the ratios Xs and Xcal are taken at different points in time.

A second voltage calibration is performed at temperature point 2 (labeled Pt 2) after the on-chip heater 134 has elevated the chip substrate temperature. The ratios Xcal(i−1), Xs, and Xcal(i+1) are digitized at three subsequent points in time. However, the chip substrate temperature continues to increase over time as the ratios are being digitized, meaning that the temperatures Tcal(i−1), Ts, and Tcal(i+1)

will not correspond to the same elevated chip substrate temperature. Since the three subsequent points in time are equally spaced apart, Tcal(i−1) and Tcal(i+1) can be interpolated to estimate a calibration temperature Tcal(i) that corresponds to the second point in time at which Ts was calculated, which is shown in the inset of FIG. 6. Calibration temperature Tcal(i) is equivalent to the average of the temperatures Tcal(i−1) and Tcal(i+1), which is shown as 0.5·[T(i−1)+T(i+1)].

Figure 7:
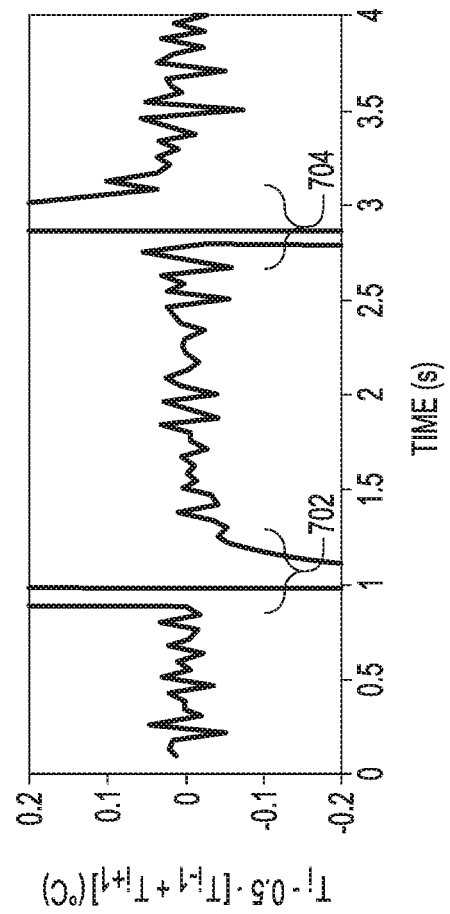
FIG. 7 illustrates a plot graph depicting an example temperature interpolation error, according to some embodiments.

The error arising from such temperature interpolation is shown in FIG. 7. Large amounts of error occur in ranges 702 and 704, which correspond to temperature transition areas 602 and 604 in FIG. 6 where the chip substrate temperature fluctuates very quickly, while the error remains low in other parts of the graph where the chip substrate temperature changes more slowly. In other words, the heat-up time, or the time during which the chip substrate is heated, should be selected to be a large enough value that allows the chip substrate temperature to reach the mostly linear portion of the heat curve produced by the on-chip heater 134.

Figure 8:
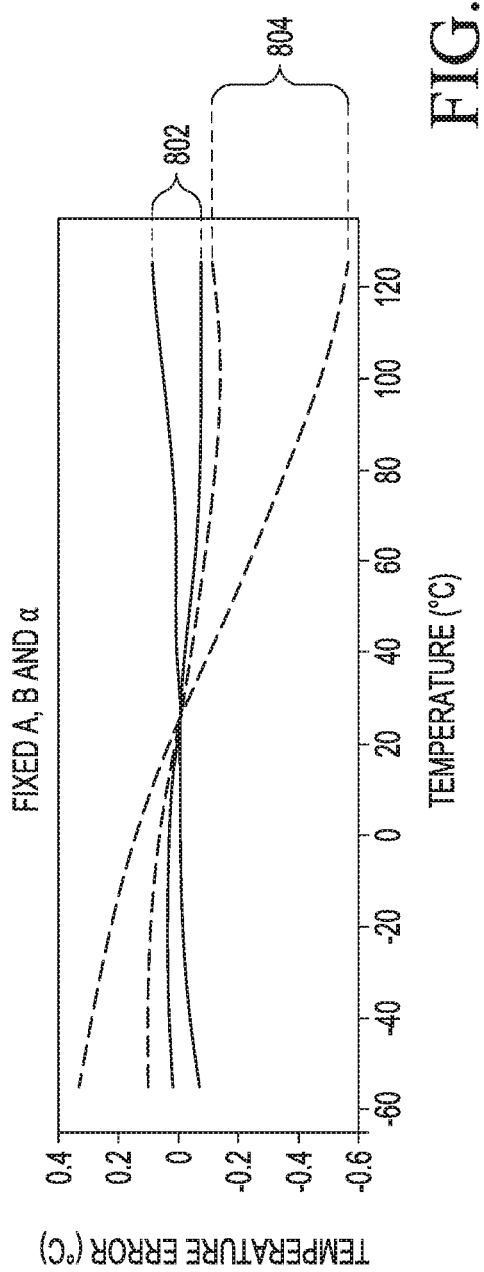
FIGS. 8, 9, 10, 11, 12, and 13 illustrate plot graphs depicting example temperature error curves, according to some embodiments.

FIG. 8 illustrates a plot graph depicting example temperature error measured in temperature sensors after performing conventional batch (thermal) calibration that calibrated a sample size of 20 ceramic packaged temperature sensors at a number of known temperatures to determine average values of fitting parameters A, B, and α. Individual sensors were then programmed with the average values as fixed fitting parameters, and thermal calibration was used to calibrate the sensors at room temperature by trimming VBE in a PTAT manner. For illustrative purposes, the same fixed fitting parameters are used in a set of ceramic packaged temperature sensors and in a set of plastic packaged temperature sensors. Temperature error of both ceramic and plastic packaged temperature sensor were obtained, where the temperature error curves of the batch calibrated ceramic packaged temperature sensors fell between the outer dashed lines illustrated as curves 802 and the error curves of the batch calibrated plastic packaged temperature sensors fell between the outer dashed lines illustrated as curves 804, where the outer dashed lines show three standard deviations from the mean value (also referred to as ±3σ). While both curves 802 and 804 show increasing error as the temperature moves away from 25° C. (room temperature), the plastic packaged temperature sensors are clearly shown to exhibit greater temperature error. This is due to higher stress caused by the plastic packaging (e.g., packaging shift) experienced than the ceramic packaged temperature sensors, which has negligible packaging effect on the ceramic sensor's chip (e.g., the plastic packaged temperature sensors have up to ±0.6° C. (±3σ) inaccuracy over the military range, while the ceramic packaged temperature sensors have up to ±0.1° C. (±3σ) inaccuracy over the military range).

Figure 9:
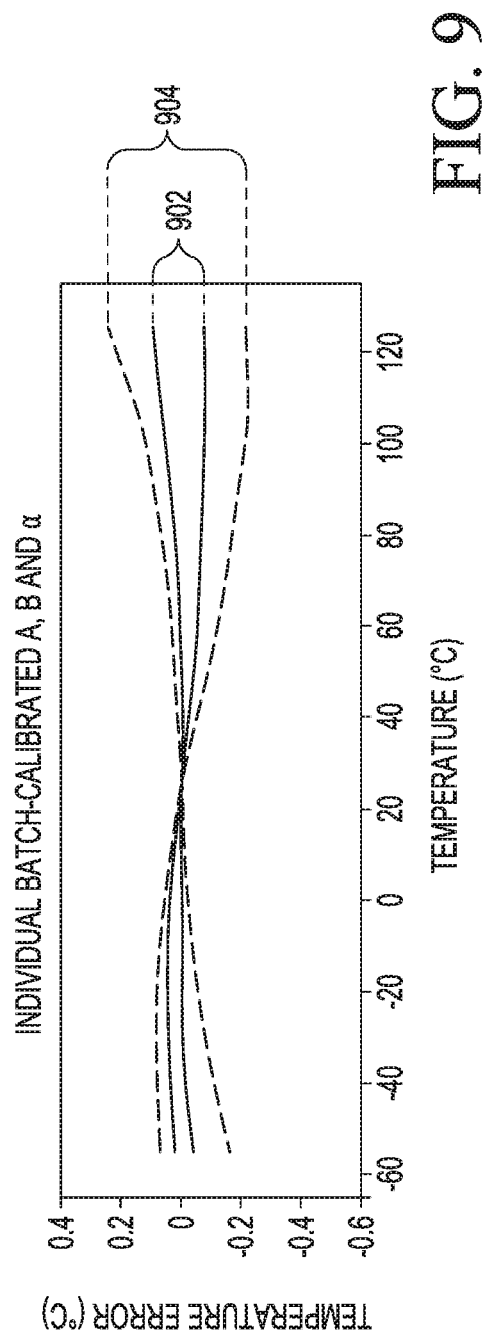

FIG. 9 illustrates a plot graph depicting example temperature error measured in temperature sensors after performing a second conventional package-specific batch (thermal) calibration, where a sample size of 20 plastic packaged temperature sensors were calibrated at a number of known temperatures to determine average values of fitting parameters A, B, and α. Individual sensors were then programmed with the average values and thermal calibration was performed to trim the sensors as before. The temperature error of the plastic packaged temperature sensors were obtained, and fell between the outer dashed lines illustrated as curves 904 (and the error curves 802 of the ceramic packaged temperature sensors are also shown as curves 902 for comparison), with the outer dashed lines showing ±3σ. While the error of the plastic packaged temperature sensors is greatly reduced (e.g., from ±0.6° C. inaccuracy down to ±0.25° C. inaccuracy over the military range), such a package-specific batch-calibration is time-consuming (with minute-long thermal time constants) and logistically complex, which significantly increases manufacturing costs. While die coatings could be used to reduce packaging stress, such an approach also increases manufacturing costs.

Figure 10:
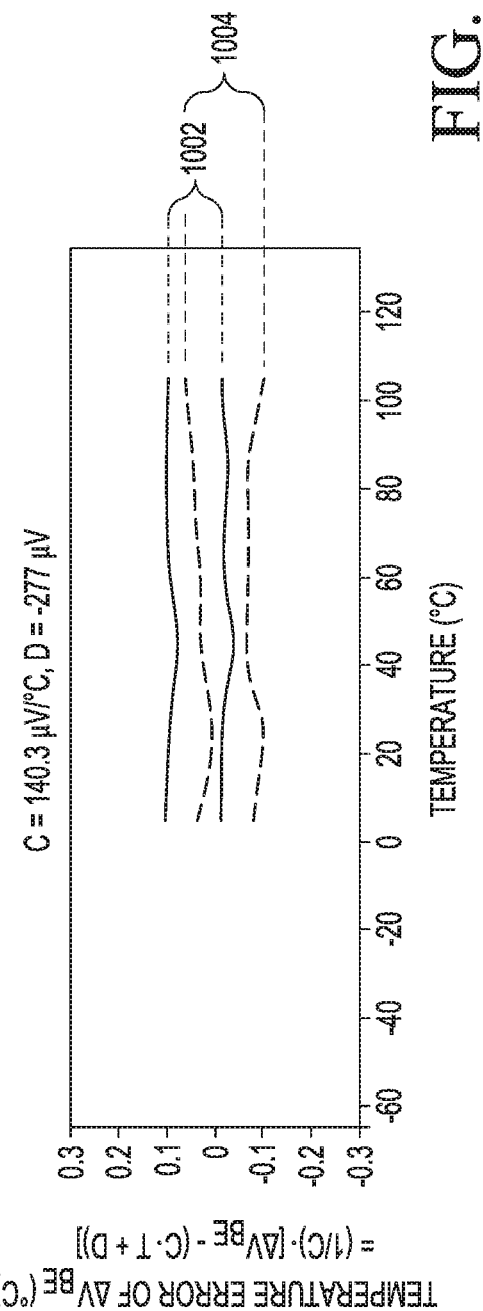

FIG. 10 illustrates a plot graph depicting example temperature error measured in temperature sensors after extracting chip temperature from ΔVBE curves of the 40 devices (20 plastic and 20 ceramic). The temperature error curves 1002 of ceramic packaged temperature sensors and the temperature error curves 1004 of plastic packaged temperature sensors are shown, where the measured inaccuracy is less than ±0.1° C. from 5° C. to 100° C. in both types of packaged temperature sensors.

Figure 11:
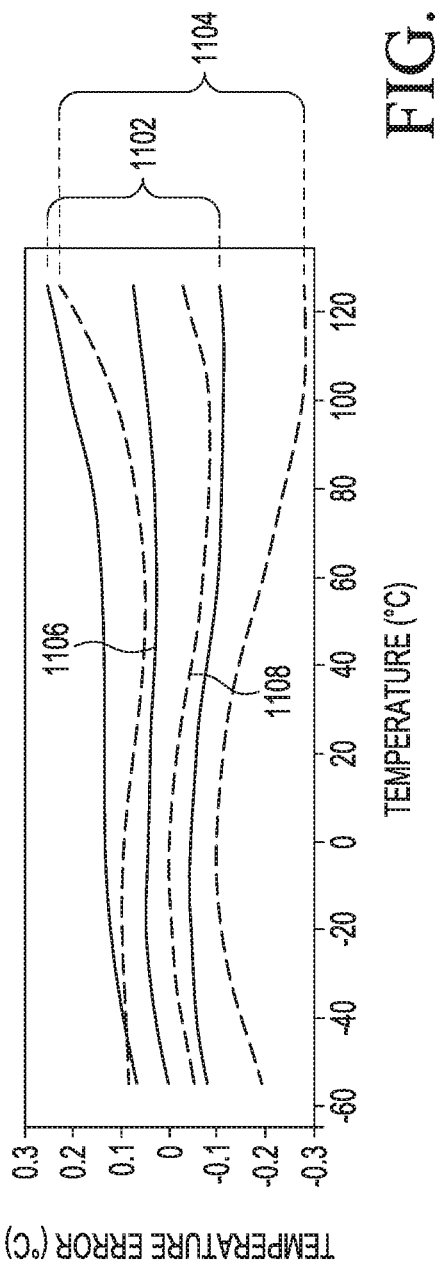

FIG. 11 illustrates a plot graph depicting example temperature error measured in temperature sensors after performing package-specific batch (thermal) calibration and voltage calibration. As discussed above in connection with FIG. 9, a sample size of 20 plastic packaged temperature sensors were calibrated at a number of known temperatures to determine average values of fitting parameters A, B, and α. Individual sensors were then programmed with the average values and voltage calibration was performed. The temperature error curves 1102 of the ceramic packaged temperature sensors and the temperature error curves 1104 of plastic packaged temperature sensors are shown, with the outer dashed lines showing three standard deviations from the median lines 1106 (for ceramic) and 1108 (for plastic), respectively. The combination of voltage calibration with package-specific fitting parameters results in ±0.3° C. (±3σ) inaccuracy over the military range, which is comparable to the results attained by thermal calibration (shown in FIG. 9), but still required an oven for the number of known temperatures during batch calibration.

Figure 12:
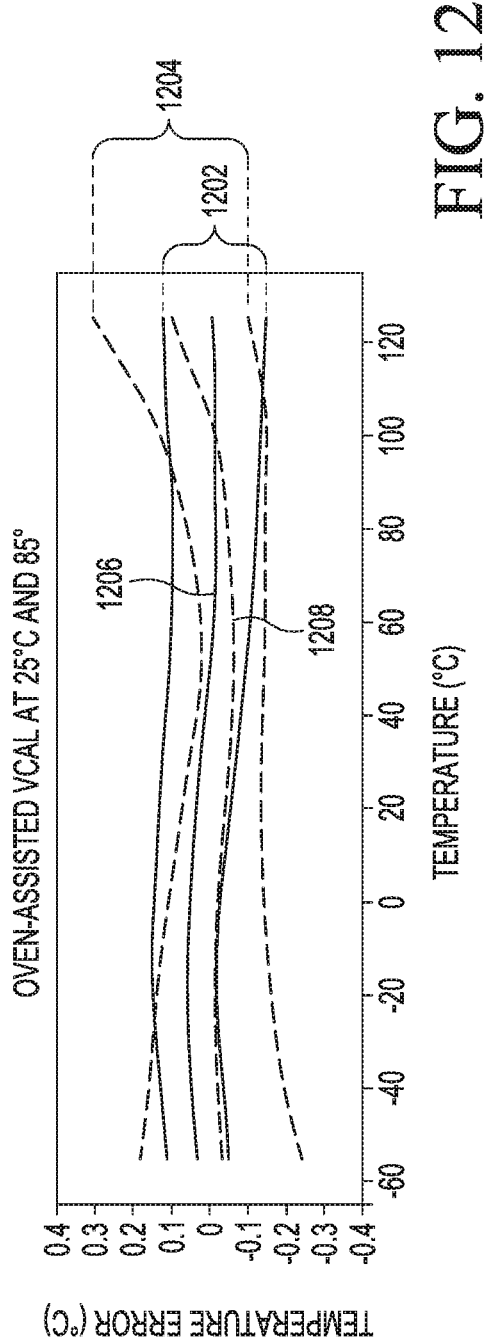

FIG. 12 illustrates a plot graph depicting example temperature error measured in temperature sensors after performing oven-assisted two temperature point voltage calibration, which uses a thermally stable environment of an oven instead of the on-chip heater to provide the two temperatures (at 25° C. and 85° C.). Temperature error curves 1202 of the ceramic packaged temperature sensors and temperature error curves 1204 of the plastic packaged temperature sensors are shown, with the outer dashed lines showing three standard deviations from median lines 1206 (for ceramic) and 1208 (for plastic), respectively. The oven-assisted voltage calibration results in ±0.3° C. (±3σ) inaccuracy over the military range.

Figure 13:
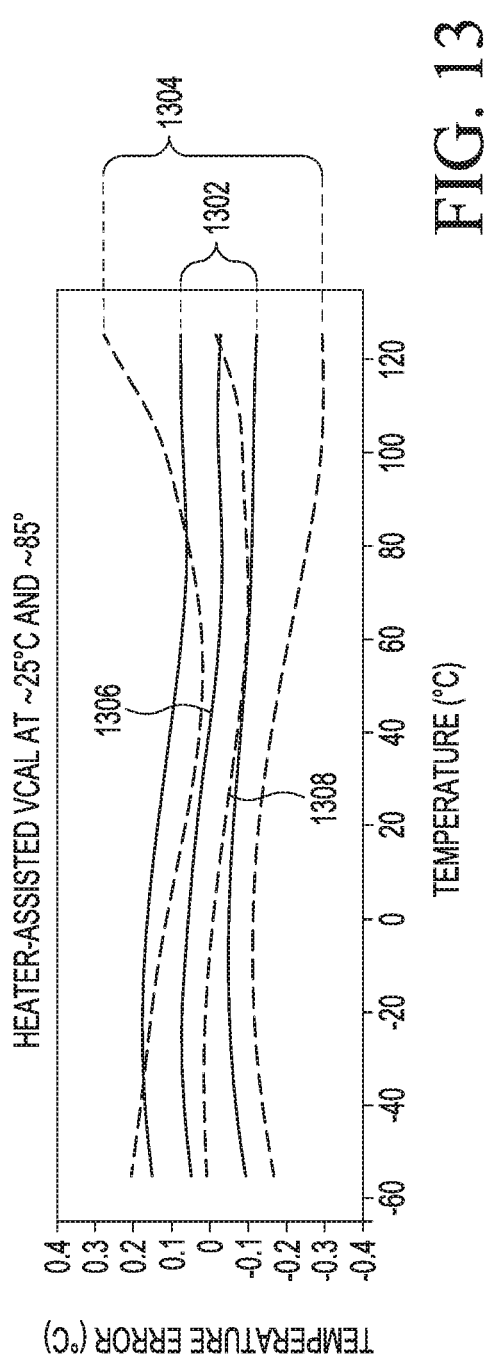

FIG. 13 illustrates a plot graph depicting example temperature error measured in temperature sensors after performing heater-assisted two temperature point voltage calibration, which uses the on-chip heater to provide the two temperatures (at 25° C. and 85° C.). Temperature error curves 1302 of the ceramic packaged temperature sensors and temperature error curves 1304 of the plastic package temperature sensors are shown, with the outer dashed lines showing three standard deviations from mean lines 1306 (for ceramic) and 1308 (for plastic), respectively. The heater-assisted voltage calibration results in ±0.3° C. (±3σ) inaccuracy over the military range, which is comparable to the results attained using oven-assisted voltage calibration (shown in FIG. 12) and the results attained using package-specific batch (thermal) calibration and individual voltage calibration (shown in FIG. 11), without requiring expensive thermal equipment or minutes long thermal time constants for package-specific batch calibration.

By now it should be appreciated that there has been provided a two temperature point voltage calibration process for adjusting at least one of one or more fitting parameters of a digital temperature sensor, where a first voltage calibration occurs at a first temperature and a second voltage calibration occurs at an elevated temperature. The digital temperature sensor includes an on-chip heater that achieves the elevated temperature within seconds, which significantly reduces the time required to perform calibration. Temperature interpolation may also be used to further shorten the calibration time at the elevated temperature.

In one embodiment of the present disclosure, a method is provided for calibrating a digital temperature sensor integrated circuit (IC) including a first sensing transistor, a second sensing transistor, and an on-chip heater, the method including: performing a first voltage calibration while the on-chip heater is off by: calculating a first calibration temperature based on a first ratio of a known external voltage to a delta voltage, wherein the delta voltage is a difference between a first base-emitter voltage of the first sensing transistor and a second base-emitter voltage of the second sensing transistor, and the delta voltage is proportional to absolute temperature, calculating a first sensed temperature based on a second ratio of the first base-emitter voltage to the delta voltage, and adjusting at least one of one or more temperature fitting parameters based on a comparison of the first sensed temperature with the first calibration temperature; activating the on-chip heater after the first voltage calibration; and performing a second voltage calibration while the on-chip heater is still activated by: calculating a second calibration temperature based, at least in part, on a third ratio of the known external voltage to the delta voltage, calculating a second sensed temperature based on a fourth ratio of the first base-emitter voltage to the delta voltage, and adjusting at least one of the one or more temperature fitting parameters based on a comparison of the second sensed temperature with the second calibration temperature.

One aspect of the above embodiment provides that the calculating the second calibration temperature includes: calculating a first interim temperature based on the third ratio of the known external voltage to the delta voltage, calculating a second interim temperature based on a fifth ratio of the known external voltage to the delta voltage, and interpolating the first and second interim temperatures to determine the second calibration temperature.

A further aspect of the above embodiment provides that the first interim temperature corresponds to a first time, the second sensed temperature corresponds to a second time after the first time, the second interim temperature corresponds to a third time after the second time, and a first amount of time elapsed between the first and second times is equal to a second amount of time elapsed between the second and third times.

A still further aspect of the above embodiment provides that a substrate temperature of the portion of the IC continues to rise over time while the on-chip heater is still activated, and the second calibration temperature corresponds to the second time.

Another aspect of the above embodiment provides that the IC further includes a biasing circuit including: a first biasing transistor, a second biasing transistor, and a resistive element having a first terminal coupled to a first electrode of the second biasing transistor, and the biasing circuit is configured to perform: generating a bias current proportional to absolute temperature, based on a difference between a first base-emitter voltage of the first biasing transistor and a second base-emitter voltage of the second biasing transistor and the resistive element; and outputting a bias voltage, based on the bias current.

A further aspect of the above embodiment provides that the IC further includes a plurality of dynamically matched current sources each having a gate electrode coupled to the bias voltage of the biasing circuit, wherein each of the plurality of dynamically matched current sources are configured to perform: outputting the bias current in response to receiving the bias voltage, wherein a set of the plurality of dynamically matched current sources provide a summed current to the first sensing transistor that is an N integer times larger than the bias current, and the bias current is provided to the second sensing transistor.

Another further aspect of the above embodiment provides that the biasing circuit further includes: an operational amplifier having a first input coupled to a second terminal of the resistive element and a second input coupled to a first electrode of the second biasing transistor, the operational amplifier configured to output the bias voltage used to bias the first and second sensing transistors.

Another further aspect of the above embodiment provides that the first and second biasing transistors are interdigitated with the first and second sensing transistors, and the resistive element surrounds the first and second biasing transistors and the first and second sensing transistors.

Another further aspect of the above embodiment provides that the activating the on-chip heater heats a portion of a substrate of the IC that includes the first and second sensing transistors, the first and second biasing transistors, and the resistive element.

Another aspect of the above embodiment provides that the IC further includes voltage-to-temperature conversion circuitry configured to perform the calculating the first and second sensed temperatures and the first and second calibration temperatures, wherein the one or more temperature fitting parameters includes a gain parameter, an offset parameter, and a mapping parameter, and the one or more temperature fitting parameters are adjusted and programmed into the voltage-to-temperature conversion circuitry.

In another embodiment of the present disclosure, a method is provided for calibrating a digital temperature sensor integrated circuit (IC) including a first sensing transistor, a second sensing transistor, an on-chip heater, and an analog-to-digital converter (ADC), the method including: activating the on-chip heater to heat a portion of the IC that includes the first and second sensing transistors; digitizing, by the ADC, a first ratio of a known external voltage to a delta voltage while the on-chip heater is still activated, wherein the delta voltage is a difference between a first base-emitter voltage of the first sensing transistor and a second base-emitter voltage of the second sensing transistor, and the delta voltage is proportional to absolute temperature; calculating a first temperature based on the first ratio; digitizing, by the ADC, a second ratio of the first base-emitter voltage to the delta voltage while the on-chip heater is still activated; calculating a second temperature based on the second ratio; digitizing, by the ADC, a third ratio of the external voltage to the delta voltage while the on-chip heater is still activated; calculating a third temperature based on the third ratio; interpolating the first temperature and the third temperature to determine a calibration temperature; and adjusting one or more temperature fitting parameters based on a comparison of the calibration temperature with the second temperature.

One aspect of the above embodiment provides that a substrate temperature of the portion of the IC continues to rise over time while the on-chip heater is still activated.

Another aspect of the above embodiment provides that the first temperature corresponds to a first time, the second temperature corresponds to a second time after the first time, the third temperature corresponds to a third time after the second time, and a first amount of time elapsed between the first and second times is equal to a second amount of time elapsed between the second and third times.

A further aspect of the above embodiment provides that the calibration temperature corresponds to the second time.

Another aspect of the above embodiment provides that the IC further includes digital backend circuitry configured to perform the calculating the first, second, and third temperatures.

A further aspect of the above embodiment provides that the one or more temperature fitting parameters includes a gain parameter, an offset parameter, and a mapping parameter, and the one or more temperature fitting parameters are programmed into the digital backend circuitry.

Another aspect of the above embodiment provides that the IC further includes control circuitry configured to perform the activating the on-chip heater and the interpolating the first and third temperatures.

A further aspect of the above embodiment provides that the control circuitry is further configured to perform selecting either the first base-emitter voltage or the external voltage provided to the ADC.

Another aspect of the above embodiment provides that the first and second sensing transistors are located in a portion of a substrate of the IC, and the on-chip heater is implemented in one or more metal layers of the IC located over the portion of the substrate in which the first and second sensing transistor are located.

Another aspect of the above embodiment provides that the first sensing transistor has a first electrode coupled to receive a first PTAT (proportional to absolute temperature) current and a second electrode coupled to ground, and the second sensing transistor has a first electrode coupled to receive a second PTAT current, a second electrode coupled to ground, and a gate electrode coupled to a gate electrode of the first sensing transistor that is tied to ground, wherein the first PTAT current is an N integer times larger than the second PTAT current.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above. In one embodiment, the digital temperature sensor device is implemented as an integrated circuit. Examples of integrated circuits include but are not limited to: a processor, memory, logic, analog circuitry, sensor, a MEMS device, a standalone discrete device such as a resistor, inductor, capacitor, diode, power transistor, and the like. In some embodiments, the digital temperature sensor device may include a combination of the integrated circuit types listed above or another type of microelectronic device.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

As used herein, the terms "substantial" and "substantially" mean sufficient to achieve the stated purpose or value in a practical manner, taking into account any minor imperfections or deviations, if any, that arise from usual and expected process abnormalities that may occur during wafer or device fabrication, which are not significant for the stated purpose or value. Also as used herein, the terms "approximately" and "about" mean a value close to or within an acceptable range of an indicated value, amount, or quality, which also includes the exact indicated value itself. An example acceptable range includes being within 10% of the indicated value, amount, or quality.

Although the invention is described herein with reference to specific embodiments, various modifications and changes can be made without departing from the scope of the present invention as set forth in the claims below. For example, additional or fewer MOSFETs may be implemented in FIG. 1 or 2. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for calibrating a digital temperature sensor integrated circuit (IC) comprising a first sensing transistor, a second sensing transistor, and an on-chip heater, the method comprising:
    performing a first voltage calibration while the on-chip heater is off by:
        calculating a first calibration temperature based on a first ratio of a known external voltage to a delta voltage, wherein
            the delta voltage is a difference between a first base-emitter voltage of the first sensing transistor and a second base-emitter voltage of the second sensing transistor, and
            the delta voltage is proportional to absolute temperature,
        calculating a first sensed temperature based on a second ratio of the first base-emitter voltage to the delta voltage, and
        adjusting at least one of one or more temperature fitting parameters based on a comparison of the first sensed temperature with the first calibration temperature;
    activating the on-chip heater after the first voltage calibration; and
    performing a second voltage calibration while the on-chip heater is still activated by:
        calculating a second calibration temperature based, at least in part, on a third ratio of the known external voltage to the delta voltage,
        calculating a second sensed temperature based on a fourth ratio of the first base-emitter voltage to the delta voltage, and
        adjusting at least one of the one or more temperature fitting parameters based on a comparison of the second sensed temperature with the second calibration temperature.

2. The method of claim 1, wherein
the calculating the second calibration temperature comprises:
    calculating a first interim temperature based on the third ratio of the known external voltage to the delta voltage,
    calculating a second interim temperature based on a fifth ratio of the known external voltage to the delta voltage, and
    interpolating the first and second interim temperatures to determine the second calibration temperature.

3. The method of claim 2, wherein
the first interim temperature corresponds to a first time,
the second sensed temperature corresponds to a second time after the first time,
the second interim temperature corresponds to a third time after the second time, and
a first amount of time elapsed between the first and second times is equal to a second amount of time elapsed between the second and third times.

4. The method of claim 3, wherein
a substrate temperature of the portion of the IC continues to rise over time while the on-chip heater is still activated, and
the second calibration temperature corresponds to the second time.

5. The method of claim 1, wherein the IC further comprises a biasing circuit comprising: a first biasing transistor, a second biasing transistor, and a resistive element having a first terminal coupled to a first electrode of the second biasing transistor, and the biasing circuit is configured to perform:
    generating a bias current proportional to absolute temperature, based on a difference between a first base-emitter voltage of the first biasing transistor and a second base-emitter voltage of the second biasing transistor and the resistive element; and
    outputting a bias voltage, based on the bias current.

6. The method of claim 5, wherein the IC further comprises a plurality of dynamically matched current sources each having a gate electrode coupled to the bias voltage of the biasing circuit, wherein
    each of the plurality of dynamically matched current sources are configured to perform:
        outputting the bias current in response to receiving the bias voltage, wherein
            a set of the plurality of dynamically matched current sources provide a summed current to the first sensing transistor that is an N integer times larger than the bias current, and
            the bias current is provided to the second sensing transistor.

7. The method of claim 5, wherein the biasing circuit further comprises:
    an operational amplifier having a first input coupled to a second terminal of the resistive element and a second input coupled to a first electrode of the second biasing transistor, the operational amplifier configured to output the bias voltage used to bias the first and second sensing transistors.

8. The method of claim 5, wherein
the first and second biasing transistors are interdigitated with the first and second sensing transistors, and
the resistive element surrounds the first and second biasing transistors and the first and second sensing transistors.

9. The method of claim 5, wherein
the activating the on-chip heater heats a portion of a substrate of the IC that includes the first and second sensing transistors, the first and second biasing transistors, and the resistive element.

10. The method of claim 1, wherein the IC further comprises
voltage-to-temperature conversion circuitry configured to perform the calculating the first and second sensed temperatures and the first and second calibration temperatures, wherein
    the one or more temperature fitting parameters comprise a gain parameter, an offset parameter, and a mapping parameter, and the one or more temperature fitting parameters are adjusted and programmed into the voltage-to-temperature conversion circuitry.

* * * * *